(12) United States Patent
Baek et al.

(10) Patent No.: US 12,512,460 B2
(45) Date of Patent: Dec. 30, 2025

(54) POSITIVE ELECTRODE AND SECONDARY BATTERY INCLUDING THE POSITIVE ELECTRODE

(71) Applicant: LG Chem, Ltd., Seoul (KR)

(72) Inventors: Joo Yul Baek, Daejeon (KR); Jun Muk Lim, Daejeon (KR); Chang Ju Lee, Daejeon (KR); Il Geun Oh, Daejeon (KR); Je Young Kim, Daejeon (KR); Sang Hoon Choy, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 581 days.

(21) Appl. No.: 16/959,301

(22) PCT Filed: Feb. 19, 2019

(86) PCT No.: PCT/KR2019/001960
§ 371 (c)(1),
(2) Date: Jun. 30, 2020

(87) PCT Pub. No.: WO2019/160391
PCT Pub. Date: Aug. 22, 2019

(65) Prior Publication Data
US 2020/0373559 A1 Nov. 26, 2020

(30) Foreign Application Priority Data

Feb. 19, 2018 (KR) .......................... 10-2018-0019487
Feb. 18, 2019 (KR) .......................... 10-2019-0018735

(51) Int. Cl.
*H01M 4/36* (2006.01)
*H01M 4/02* (2006.01)
*H01M 4/131* (2010.01)
*H01M 4/505* (2010.01)
*H01M 4/525* (2010.01)
*H01M 4/62* (2006.01)
*H01M 10/0525* (2010.01)

(52) U.S. Cl.
CPC .......... *H01M 4/362* (2013.01); *H01M 4/131* (2013.01); *H01M 4/505* (2013.01); *H01M 4/525* (2013.01); *H01M 4/623* (2013.01); *H01M 4/625* (2013.01); *H01M 10/0525* (2013.01); *H01M 2004/021* (2013.01); *H01M 2004/028* (2013.01)

(58) Field of Classification Search
CPC ...... H01M 4/525; H01M 4/623; H01M 4/625; Y02E 60/10
See application file for complete search history.

(56) References Cited

U.S. PATENT DOCUMENTS

2012/0244334 A1* 9/2012 Park ...................... H01M 4/625
428/221
2015/0118555 A1* 4/2015 Akikusa .............. H01M 4/5825
429/217
2016/0087283 A1* 3/2016 Sumioka ............. H01M 8/0234
264/129
2016/0336587 A1 11/2016 Jung et al.
2017/0365858 A1 12/2017 Yun et al.
2018/0159131 A1 6/2018 Seol et al.
2018/0219212 A1 8/2018 Seol et al.
2018/0248195 A1 8/2018 Choi et al.
2019/0044150 A1 2/2019 Kim et al.

FOREIGN PATENT DOCUMENTS

| CN | 107046815 A | 8/2017 | | |
|---|---|---|---|---|
| CN | 107580732 A | 1/2018 | | |
| JP | 2003303593 A | 10/2003 | | |
| JP | 2015095423 A | * | 5/2015 | |
| JP | 2018533175 A | 11/2018 | | |
| JP | 2018535520 A | 11/2018 | | |
| KR | 20160039835 A | 4/2016 | | |
| KR | 20160146580 A | 12/2016 | | |
| KR | 20170063402 A | 6/2017 | | |
| KR | 20170069153 A | 6/2017 | | |
| KR | 20170127240 A | 11/2017 | | |
| WO | WO-2007100306 A1 | * | 9/2007 | ............ B82Y 30/00 |
| WO | WO-2013094100 A1 | * | 6/2013 | .......... H01M 10/052 |
| WO | WO-2016114589 A1 | * | 7/2016 | .......... H01M 10/052 |
| WO | 2016200223 A1 | 12/2016 | | |

(Continued)

OTHER PUBLICATIONS

Kim et al. WO-2016114589 Machine Translation (Year: 2016).*
Xiaoke et al., "The stability, viscosity and thermal conductivity of carbon nanotubes nanofluids with high particle concentration: A surface modification approach", Powder Technology, vol. 361, Feb. 1, 2020, pp. 957-967, https://doi.org/10.1016/j.powtec.2019.10.106 (Year: 2020).*
Ochiai et al., JP-2015095423, Machine translation (Year: 2015).*
Choi et al., WO-2017095151, Machine Translation (Year: 2017).*
Fujiwara et al., WO-2013094100, Machine Translation (Year: 2013).*
Search report from International Application No. PCT/KR2019/001960, mailed May 23, 2019.

(Continued)

*Primary Examiner* — Ula C Ruddock
*Assistant Examiner* — Anna Korovina
(74) *Attorney, Agent, or Firm* — Lerner David LLP

(57) ABSTRACT

A positive electrode includes a current collector and a positive electrode active material layer disposed on the current collector, wherein the positive electrode active material layer includes a positive electrode active material, carbon nanotube, and a binder, the binder includes polyvinylidene fluoride which has a weight average molecular weight of 720,000 g/mol to 980,000 g/mol, a BET specific surface area of the carbon nanotube is 140 m²/g to 195 m²/g, and the positive electrode satisfies the following Formula 1:

$$1.3 \leq B/A \leq 3.4 \qquad \text{[Formula 1]}$$

in Formula 1, B is an amount (wt %) of the polyvinylidene fluoride in the positive electrode active material layer, and A is an amount (wt %) of the carbon nanotube in the positive electrode active material layer.

12 Claims, No Drawings

(56) References Cited

FOREIGN PATENT DOCUMENTS

WO     WO-2017095151 A1 *   6/2017   .......... C01B 32/158
WO        2017164703 A1    9/2017

OTHER PUBLICATIONS

"A Basic Guide to Particle 3 Characterization", Malvern Instruments Worldwide—White Paper, May 2, 2012 (May 2, 2012), pp. 1-26, XP055089322.
Dent, et. al: "GPC/SEC Practical Tips and Tricks", Gulf Coast Conference; Oct. 2011 (Oct. 1, 2011), XP055608344.
European Search Report for Application No. EP197548985, dated Dec. 11, 2020, 11 pages.
R Brdicka et al: "Surface area and pore size determination Modern Methods in Heterogeneous Catalysis Research", Handbook of Heterogeneous Catalysis, VCH, Weinheim Handbook of Porous Solids, Jan. 1, 2004 (Jan. 1, 2004), XP055643749.
Search Report dated Sep. 15, 22 from Office Action for Chinese Application No. 201980007105 issued Sep. 22, 2022. 3 pgs.

* cited by examiner

POSITIVE ELECTRODE AND SECONDARY BATTERY INCLUDING THE POSITIVE ELECTRODE

CROSS-REFERENCE TO RELATED APPLICATIONS

The present application is a national phase entry under 35 U.S.C. § 371 of International Application No. PCT/KR2019/001960 filed on Feb. 19, 2019, which claims priority from Korean Patent Application Nos. 10-2018-0019487, filed on Feb. 19, 2018, and 10-2019-0018735, filed on Feb. 18, 2019, in the Korean Intellectual Property Office, the disclosures of which are incorporated herein by reference.

TECHNICAL FIELD

The present invention relates to a positive electrode satisfying an optimal relation of the specific binder content and the specific carbon nanotube content, and a secondary battery including the same.

BACKGROUND ART

Recently, demand for batteries as an energy source has been increased as technology development and demand with respect to mobile devices have increased. Accordingly, study on batteries which meet various requirements is diversely conducted. Particularly, study on lithium secondary batteries having high energy density, excellent life and cycle properties are being actively conducted as a power source of such devices.

Lithium secondary batteries are batteries including an electrode assembly which includes a positive electrode including a positive electrode active material which is capable of the intercalation and deintercalation of lithium ions, a negative electrode including a negative electrode active material which is capable of the intercalation and deintercalation of lithium ions, and a minute porous separator disposed between the positive electrode and a negative electrode, and a nonaqueous electrolyte containing lithium ions.

In the positive electrode and/or the negative electrode, a positive electrode active material layer may include a conducting agent to improve conductivity. Conventionally, a dot-type conducting agent such as carbon black was mainly used. However, if the amount of the conducting agent increases to improve conductivity, the relative amount of a positive electrode active material or a negative electrode active material decreases and capacity of a battery decreases, or a positive electrode binder or a negative electrode binder decreases to degrade adhesiveness. Particularly, in a positive electrode, since the conductivity of a positive electrode active material itself is low, the above-mentioned defects are becoming bigger.

In order to solve such defects, a method of using a linear conducting agent such as carbon nanotube has been reported. The carbon nanotube has a relatively larger length than a particle-type conducting agent, and the improving effect of conductivity and improvement of bonding force of constituent materials of a positive electrode active material layer may be achieved with a small amount.

Meanwhile, in order to improve adhesiveness between a positive electrode active material layer and a current collector (positive electrode adhesiveness), the positive electrode active material layer may include a binder. The binder generally contributes little to the improvement of conductivity of the positive electrode active material layer. Accordingly, even though carbon nanotube is used, the improvement of the conductivity through the use in combination with a binder is limited.

Accordingly, study is being carried out to improve the properties of a binder or carbon nanotube.

DISCLOSURE OF THE INVENTION

Technical Problem

An aspect of the present invention provides a positive electrode, by which a viscosity of a positive electrode slurry may be maintained to a preferred level and advantages in consideration of processability and manufacturing cost may be obtained, and which has excellent positive electrode adhesiveness and improved conductivity at the same time, and a secondary battery including the same.

Technical Solution

According to an embodiment of the present invention, there is provided a positive electrode including a current collector and a positive electrode active material layer disposed on the current collector, wherein the positive electrode active material layer includes a positive electrode active material, carbon nanotube, and a binder, the binder includes polyvinylidene fluoride which has a weight average molecular weight of 720,000 g/mol to 980,000 g/mol, a BET specific surface area of the carbon nanotube is 140 m²/g to 195 m²/g, and the positive electrode satisfies the following Formula 1:

$$1.3 \leq B/A \leq 3.4 \qquad \text{[Formula 1]}$$

In Formula 1, B is an amount (wt %) of the polyvinylidene fluoride in the positive electrode active material layer, and A is an amount (wt %) of the carbon nanotube in the positive electrode active material layer.

According to another embodiment of the present invention, there is provided a secondary battery including the positive electrode.

Advantageous Effects

According to the present invention, the conductivity of a positive electrode and the adhesiveness of a positive electrode may be improved and excessive increase or excessive decrease of a positive electrode slurry during manufacturing the positive electrode may be restrained by controlling the BET specific surface area of carbon nanotube, the amount ratio of polyvinylidene fluoride and the carbon nanotube and the weight average molecular weight of the polyvinylidene fluoride. Accordingly, there are advantages in view of processability and manufacturing costs during manufacturing a positive electrode, the application of a positive electrode slurry is easy, and a positive electrode active material layer may be uniformly formed. In addition, the output of a battery and life characteristics at a high temperature may be even more improved.

MODE FOR CARRYING OUT THE INVENTION

Hereinafter, the present invention will be described in more detail to assist the understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The positive electrode according to an embodiment of the present invention includes a current collector and a positive electrode active material layer disposed on the current collector, wherein the positive electrode active material layer includes a positive electrode active material, carbon nanotube, and a binder, the binder includes polyvinylidene fluoride having a weight average molecular weight of 720,000 g/mol to 980,000 g/mol, a BET specific surface area of the carbon nanotube is from 140 m$^2$/g to 195 m$^2$/g, and the following Formula 1 is satisfied:

$$1.3 \leq B/A \leq 3.4 \quad \text{[Formula 1]}$$

In Formula 1, B is an amount (wt %) of the polyvinylidene fluoride in the positive electrode active material layer, and A is an amount (wt %) of the carbon nanotube in the positive electrode active material layer.

The current collector may be any one as long as it has conductivity and induces no chemical changes to the battery, without specific limitation. For example, the current collector may use copper, stainless steel, aluminum, nickel, titanium, fired carbon, or aluminum or stainless steel of which surface is treated with carbon, nickel, titanium, silver, etc. Particularly, a transition metal which absorbs carbon well, such as copper and nickel may be used as the current collector.

The positive electrode active material layer may be disposed on the current collector. The positive electrode active material layer may be disposed on one side or both sides of the current collector.

The positive electrode active material layer may include a positive electrode active material, carbon nanotube, and a binder. Particularly, the positive electrode active material layer may be composed of a positive electrode active material, carbon nanotube, and a binder.

The positive electrode active material may include Li[Ni$_{x1}$Mn$_{y1}$Co$_{z1}$]O$_2$ (0.40≤x1≤0.70, 0.15≤y1≤0.30, 0.15≤z1≤0.30, and x1+y1+z1=1). The positive electrode active material has high energy density and allows the manufacture of a battery with high capacity. Particularly, the positive electrode active material may include Li(Ni$_{x2}$Mn$_{y2}$Co$_{z2}$)O$_2$ (0.56<x2<0.68, 0.16<y2<0.22, 0.16<z2<0.22, and x2+y2+z2=1). The positive electrode active material has high energy density and excellent safety.

The positive electrode active material may have an average particle diameter (D$_{50}$) of 3 μm to 20 μm, particularly, 6 μm to 18 μm, more particularly, 9 μm to 16 μm. If the above range is satisfied, the life characteristics at a high temperature and output characteristics of a battery may be improved. In the present disclosure, in a particle diameter distribution curve of particles, the average particle diameter (D$_{50}$) may be defined as a particle diameter corresponding to 50% of a volume accumulation amount. The average particle diameter (D$_{50}$) may be measured using, for example, a laser diffraction method. By the laser diffraction method, measurement of a particle diameter from a submicron region to several mm degree is generally possible, and results of high reproducibility and high resolution may be obtained.

The positive electrode active material may be 95.6 w % to 99.0 wt % in the positive electrode active material layer, and particularly, may be 97.0 et % to 98.0 wt %. If the above-mentioned range is satisfied, the adhesiveness of a positive electrode and the conductivity of the positive electrode may be improved at the same time.

In the present invention, the carbon nanotube may act as a positive electrode conducting agent. Particularly, the positive electrode active material layer may include a positive electrode conducting agent which consists of the carbon nanotube. For example, if the positive electrode active material layer includes a particle phase conducting agent such as acetylene black or a plate phase conducting agent in addition to the carbon nanotube, the conductivity of the positive electrode may be degraded when compared with the conductivity of the positive electrode of the present invention.

The carbon nanotube may be a bundle-type carbon nanotube. The bundle type carbon nanotube may include a plurality of carbon nanotube units. Particularly, the "bundle type" used herein refers to a secondary form of a bundle or rope shape, in which a plurality of carbon nanotube units are arranged such that the axes in a length direction of the carbon nanotube units are arranged in parallel in the substantially same orientation, or entangled, unless otherwise noted. In the carbon nanotube unit, a graphite sheet has a cylinder shape with a nanometer size diameter and a sp$^2$ bond structure. In this case, according to the angle rolled and structure of the graphite sheet, conductor or semiconductor properties may be shown. The carbon nanotube unit may be classified into a single-walled carbon nanotube (SWCNT) unit, a double-walled carbon nanotube (DWCNT) unit and a multi-walled carbon nanotube (MWCNT) unit. Particularly, the carbon nanotube unit may be the multi-walled carbon nanotube unit. The multi-walled carbon nanotube unit is preferable, because it requires lower energy for dispersion than the single-walled carbon nanotube unit and the double-walled carbon nanotube unit, and has dispersion conditions to an easy degree of control.

The average diameter of the carbon nanotube unit may be from 1 nm to 30 nm, particularly, from 3 nm to 26 nm, more particularly, from 5 nm to 22 nm. If the above-mentioned range is satisfied, the dispersion of the carbon nanotube in a positive electrode slurry is easy, and the conductivity of the positive electrode may be improved. The average diameter may be measured by TEM or SEM.

The BET specific surface area of the carbon nanotube may be from 140 m$^2$/g to 195 m$^2$/g, particularly, from 145 m$^2$/g to 195 m$^2$/g, more particularly, from 160 m$^2$/g to 190 m$^2$/g. If the BET specific surface area of the carbon nanotube is less than 140 m$^2$/g, the viscosity of a positive electrode slurry is too low during manufacturing the positive electrode, and thus, the coating and drying processability of the positive electrode slurry is degraded, and the manufacturing cost rises excessively. In addition, due to the decrease of the BET specific surface area, conductive path decreases, and the conductivity of the positive electrode is largely reduced. Meanwhile, if the BET specific surface area of the carbon nanotube is greater than 195 m$^2$/g, the viscosity of the positive electrode slurry increases excessively, and the application of the positive electrode slurry on a current collector is very difficult. Thus, the positive electrode slurry may not be uniformly applied and the positive electrode active material layer thus formed is nonuniform. In addition, due to the increase of the BET specific surface area, the dispersibility of the carbon nanotube may be degraded, and the conductivity of the positive electrode may be largely degraded. The BET specific surface area may be measured through a nitrogen absorption BET method.

The binder may include polyvinylidene fluoride (PVdF).

The weight average molecular weight of the polyvinylidene fluoride may be from 720,000 g/mol to 980,000 g/mol, particularly, from 750,000 g/mol to 950,000 g/mol, more particularly, from 800,000 g/mol to 920,000 g/mol. If the weight average molecular weight is less than 720,000 g/mol, even though Formula 1, which will be explained later, is satisfied, the viscosity of a positive electrode slurry formed during manufacturing a positive electrode becomes too low, and applying of the positive electrode slurry is difficult, processability during drying is excessively deteriorated, and manufacturing cost rises excessively. In addition, the adhesiveness of the positive electrode is excessively decreased, and defects of the deintercalation of a positive electrode active material may arise. Meanwhile, if the weight average molecular weight is greater than 980,000 g/mol, defects of the excessive increase of the resistance of a positive electrode and a battery may arise. In addition, the viscosity of the positive electrode slurry increases excessively, for example, increases to 50,000 cp or more at room temperature, and the application of the positive electrode slurry itself may become difficult, and the positive electrode active material layer thus formed may become nonuniform, and thus, battery performance may be deteriorated. The weight average molecular weight of the polyvinylidene fluoride may be the most optimal range for satisfying the improvement of the processability and the manufacturing cost, the uniformity of the positive electrode active material layer, the improvement of the conductivity of a positive electrode and the improvement of the adhesiveness of a positive electrode at the same time in a limited composition.

The binder may further include a non fluorine-based binder. The non fluorine-based binder may be at least one among nitrile butadiene rubber (NBR), and hydrogenated-nitrile butadiene rubber (H-NBR), and may particularly be the hydrogenated-nitrile butadiene rubber.

The weight ratio of the polyvinylidene fluoride and the non fluorine-based binder may be 23:1 to 1:1, particularly, 20:1 to 3:1. If the above-described range is satisfied, effects of improving the adhesiveness of a positive electrode and the dispersion of carbon nanotube may be achieved.

The positive electrode of the present invention may satisfy the following Formula 1:

$$1.3 \leq B/A \leq 3.4 \quad \text{[Formula 1]}$$

In Formula 1, B is an amount (wt %) of the polyvinylidene fluoride in the positive electrode active material layer, and A is an amount (wt %) of the carbon nanotube in the positive electrode active material layer.

If B/A is less than 1.3, the adhesiveness of the positive electrode is too weak and the intercalation of the positive electrode active material may arise during manufacturing the positive electrode. In addition, the viscosity of the positive electrode slurry may increase excessively, the application of the positive electrode itself may become difficult, and a positive electrode active material layer may become non-uniform, and thus, battery performance may be deteriorated. Meanwhile, if B/A is greater than 3.4, the adhesiveness of the positive electrode may be excellent but powder resistance may increase excessively, and battery resistance may increase excessively. Accordingly, the output characteristics of a battery is largely degraded. In addition, the viscosity of a positive electrode slurry formed during manufacturing a positive electrode may decrease excessively, and the application of the positive electrode slurry is difficult, processability during drying is degraded excessively, and the manufacturing cost arises excessively.

The positive electrode may satisfy the following Formula 2:

$$1.3 \leq B/A \leq 1.85 \quad \text{[Formula 1]}$$

If Formula 2 is satisfied, the powder resistance and the adhesiveness of the positive electrode may be improved even more. This result is obtained because the viscosity of the positive electrode slurry increases to some degree as far as the uniformity of a positive electrode active material layer is not harmed and the migration of a binder in the positive electrode slurry is restrained. Accordingly, since the adhesiveness of a positive electrode is improved and the binder is not applied nonuniformly, the conductivity covering the entire positive electrode may be improved even more.

A secondary battery according to another embodiment of the present invention may include a positive electrode; a negative electrode; a separator disposed between the positive electrode and the negative electrode; and an electrolyte, and the positive electrode is the same as the above-described positive electrode of the embodiment. Accordingly, the explanation on the positive electrode will be omitted.

The negative electrode may include a negative electrode current collector, and a negative electrode active material layer disposed on one side or both sides of the negative electrode current collector.

The negative electrode current collector is not specifically limited as long as it has conductivity without causing chemical changes in the battery, and, for example, copper, stainless steel, aluminum, nickel, titanium, fired carbon, or aluminum or stainless steel that is surface-treated with carbon, nickel, titanium, silver, or the like may be used as the negative electrode current collector. Particularly, a transition metal which absorbs carbon well, such as copper and nickel may be used as the current collector.

The negative electrode active material layer may include a negative electrode active material, a negative electrode conducting agent, and a negative electrode binder.

The negative electrode active material may be graphite-based active material particles or silicon-based active material particles. The graphite-based active material particle may use one or more selected from the group consisting of artificial graphite, natural graphite, graphitized carbon fibers, and graphitized mesocarbon microbeads, and particularly, in case of using the artificial graphite, rate performance may be improved. The silicon-based active material particle may use one or more selected from the group consisting of Si, $SiO_x$ (0<x<2), a Si—C composite and a Si—Y alloy (where Y is an element selected from the group consisting of an alkali metal, an alkaline earth metal, a transition metal, an element in group 13, an element in group 14, a rare earth element and a combination thereof), and particularly, in case of using Si, a battery with high capacity may be attained.

The negative electrode binder may include at least one selected from the group consisting of a polyvinylidene fluoride-hexafluoropropylene copolymer (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene butadiene rubber (SBR), fluorine rubber, a polyacrylic acid, and a material obtained by substituting hydrogen therein with Li, Na or Ca, and may include various copolymers thereof.

The negative electrode conducting agent may be any one without limitation as long as it has conductivity without causing chemical changes in the battery. For example, graphites such as natural graphite and artificial graphite; carbon blacks such as carbon black, acetylene black, Ketjen black, channel black, furnace black, lamp black, and thermal black; conductive fibers such as carbon fiber and metal fiber; conductive tubes such as carbon nanotube; powders of metal such as fluorocarbon powder, aluminum powder and nickel powder; conductive whiskers such as zinc oxide whisker and potassium titanate whisker; conductive metal oxides such as titanium oxide; or conductive materials such as polyphenylene derivatives.

The separator separates the negative electrode and the positive electrode and provides a transfer path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be preferable. Particularly, a porous polymer film, for example, a porous polymer film prepared from a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the manufacture of a lithium secondary battery, but the present invention is not limited thereto.

Particularly, the electrolyte may include a nonaqueous organic solvent and a metal salt.

As the nonaqueous organic solvent, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate, and ethyl propionate, may be used.

Particularly, ethylene carbonate and propylene carbonate, which are cyclic carbonates among the carbonate organic solvents, are organic solvents with a high viscosity, which have high dielectricity and dissociate lithium salts well and thus, may be used preferably. If such cyclic carbonate is mixed with a linear carbonate with a low viscosity and low dielectricity, such as dimethyl carbonate and diethyl carbonate in a suitable ratio, an electrolyte having high electrical conductivity may be prepared, more preferably.

The metal salt may use a lithium salt, and the lithium salt is a material which may be easily dissolved in the nonaqueous electrolyte, and as the anions of the lithium salt, for example, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ may be used.

In addition to the electrolyte components, at least one additive, for example, a halo-alkylene carbonate-based compound such as difluoroethylene carbonate, pyridine, triethylphosphite, triethanolamine, cyclic ether, ethylenediamine, n-glyme, hexaphosphoric acid triamide, nitrobenzene derivatives, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte to improve lifetime characteristics of the battery, suppress the reduction in battery capacity, and improve the discharge capacity of the battery.

According to another embodiment of the present invention, a battery module including the secondary battery as a unit cell and a battery pack including the battery module are provided. The battery module and the battery pack include the secondary battery having high capacity, and high rate performance and cycle properties, and may be used as a power source of a medium and large sized device selected from the group consisting of electric cars, a hybrid electric vehicle, a plug-in hybrid electric vehicle, and a power storage system.

Hereinafter, embodiments of the present invention will be described in detail so that a person skilled in the art could easily conduct the embodiments. The invention may, however, be embodied in many different forms and should not be construed as being limited to the embodiments set forth herein.

Example 1: Preparation of Positive Electrode Slurry $Li(Ni_{0.6}Mn_{0.2}Co_{0.2})O_2$ having an average particle diameter ($D_{50}$) of 12 μm was used as a positive electrode active material, and bundle type carbon nanotube (specific surface area of 185 m$^2$/g) composed of carbon nanotube units (multi-walled) was used as a conducting agent, where an average diameter of the carbon nanotube units was 12 nm.

A conducting agent dispersion including the multi-walled carbon nanotube, hydrogenated-nitrile butadiene rubber (H-NBR), and a N-methylpyrrolidone (NMP) dispersing medium was prepared. Then, the positive electrode active material, PVdF having a weight average molecular weight of 880,000 g/mol, the conducting agent dispersion and NMP were mixed and a positive electrode slurry having the solid content of 72% and a weight ratio of the positive electrode active material, carbon nanotube, PVdF and H-NBR of 97.5:0.7:1.66:0.14 was prepared.

Examples 2 to 4 and Comparative Examples 1 to 7: Preparation of Positive Electrode Slurry Positive electrode slurries of Examples 2 to 4 and Comparative Examples 1 to 7 were prepared by the same method as in Example 1 except for changing the contents of the carbon nanotube, PVdF and H-NBR, the BET specific surface area of the carbon nanotube, and the weight average molecular weight of the PVdF as listed in Table 1 below.

TABLE 1

|  | Positive electrode active material content (wt %) | Carbon nanotube content (wt %) | PVdF content (wt %) | H-NBR content (wt %) | PVdF content/ carbon nanotube content (B/A) | Carbon nanotube BET specific surface area ($m^2/g$) | PVdF weight average molecular weight (g/mol) |
|---|---|---|---|---|---|---|---|
| Example 1 | 97.5 | 0.7 | 1.66 | 0.14 | 2.37 | 185 | 880,000 |
| Example 2 | 97.5 | 0.9 | 1.46 | 0.14 | 1.62 | 185 | 880,000 |
| Example 3 | 97.5 | 0.8 | 1.56 | 0.14 | 1.95 | 185 | 880,000 |
| Example 4 | 97.5 | 0.6 | 1.76 | 0.14 | 2.93 | 185 | 880,000 |
| Comparative Example 1 | 97.5 | 1.2 | 1.16 | 0.14 | 0.97 | 185 | 880,000 |
| Comparative Example 2 | 97.5 | 0.3 | 2.06 | 0.14 | 6.9 | 185 | 880,000 |
| Comparative Example 3 | 97.5 | 0.7 | 1.66 | 0.14 | 2.37 | 280 | 880,000 |
| Comparative Example 4 | 97.5 | 0.7 | 1.66 | 0.14 | 2.37 | 120 | 880,000 |
| Comparative Example 5 | 97.5 | 0.7 | 1.66 | 0.14 | 2.37 | 185 | 1,200,000 |
| Comparative Example 6 | 97.5 | 0.7 | 1.66 | 0.14 | 2.37 | 185 | 500,000 |
| Comparative Example 7 | 97.5 | 0.7 | 1.66 | 0.14 | 2.37 | 220 | 880,000 |

The contents of the positive electrode active material, carbon nanotube, PVdF and H-NBR were based on the total amount of the positive electrode active material layer.

Experimental Example 1: Evaluation of Positive Electrode Slurry Viscosity

The viscosity of the positive electrode slurries of Examples 1 to 4 and Comparative Examples 1 to 7 were measured at 25° C. using a Brookfield B-type viscometer. Particularly, viscosity was measured after rotating with a rotor number 64, the number of revolutions of 12 rpm for 1 minute, and listed in Table 2.

Experimental Example 2: Evaluation of Powder Resistance

Each of the positive electrode slurries of Examples 1 to 4 and Comparative Examples 1 to 7 was dried at a temperature of 130° C. for 3 hours in vacuum, and pulverized to prepare a powder. Then, a pellet was formed using a Loresta GP equipment of Mitsubishi Chem Analytic Co. in an atmosphere of 25° C. and a relative humidity of 50% under 9.8 MPa load conditions. Then, the powder resistance was measured by a 4-probe method and listed in Table 2.

Experimental Example 3: Evaluation of Positive Electrode Adhesiveness

A positive electrode was manufactured using each of the positive electrode slurries of Examples 1 to 4 and Comparative Examples 1 to 7. Particularly, the positive electrode slurry was applied on a positive electrode current collector (Al) having a thickness of 20 μm, and dried in a vacuum oven of 130° C. for 6 hours. Then, the current collector coated with the positive electrode slurry was put between rolls heated to 60° C. and rolled with a pressure of 10 MPa to manufacture a positive electrode having a final thickness (current collector+active material layer) of 95 μm and a loading amount of the positive electrode active material layer of 680 mg/25 $cm^2$.

The positive electrode was punched into 20 mm×150 mm and fixed at the center portion of a 25 mm×75 mm slide glass using a tape. The 90-degree peel strength was measured while peeling the current collector using a UTM. The peel strength was measured five times or more for each positive electrode, and an average value was shown as the positive electrode adhesiveness. The measured results are listed in Table 2.

TABLE 2

|  | Positive electrode slurry viscosity (cP) | Powder resistance (Ω × cm) | Positive electrode adhesiveness (gf/20 mm) |
|---|---|---|---|
| Example 1 | 10,560 | 65.3 | 21.1 |
| Example 2 | 18,800 | 42.0 | 33.0 |
| Example 3 | 14,240 | 55.8 | 22.3 |
| Example 4 | 9,040 | 94.2 | 25.5 |
| Comparative Example 1 | 42,680 | 31.2 | 7.7 |
| Comparative Example 2 | 3,290 | 658.4 | 63.8 |
| Comparative Example 3 | 37,850 | 105.1 | 28.6 |
| Comparative Example 4 | 2,970 | 203.9 | 18.4 |
| Comparative Example 5 | 50,000 or more | 432.8 | 53.7 |
| Comparative Example 6 | 1,120 | 138.5 | 5.2 |
| Comparative Example 7 | 31,150 | 101.8 | 25.3 |

Referring to Table 2, in Examples 1 to 4, which satisfies the relation of 1.3≤B/A≤3.4, it may be found that the powder resistance was a low degree but excellent positive electrode adhesiveness was maintained. In addition, it may be found that since the viscosity of the positive electrode slurry was not an excessively high degree or low degree, defects on processability were not occur. Meanwhile, in Comparative Example 1, where B/A (polyvinylidene fluoride content/ carbon nanotube content) was 0.97 and less than 1.3, the powder resistance was low but the positive electrode adhesiveness was excessively low. In Comparative Example 2, where B/A was 6.9 and greater than 3.4, the positive electrode adhesiveness was very high but the powder resistance was excessively high. That is, in case of satisfying the preferred B/A range, preferred degrees of all the positive electrode conductivity, the positive electrode adhesiveness and the viscosity of the positive electrode slurry were found to be achieved.

Meanwhile, in Comparative Example 3 and Comparative Example 7, where the BET specific surface areas were 280 m$^2$/g and 220 m$^2$/g, respectively, and higher degrees than the Examples, the viscosity of the positive electrode slurry was excessively high. In Comparative Example 4, where the BET specific surface area was 120 m$^2$/g and a lower degree than the Examples, the viscosity of the positive electrode slurry was found to be excessively low. If a suitable degree of the BET specific surface area is satisfied, a preferred degree of the viscosity of the positive electrode may be satisfied, coating and drying processability during manufacturing the positive electrode may be improved, the manufacturing cost may be saved, and a positive electrode active material layer may be uniformly formed. In addition, both Comparative Example 3 and Comparative Example 4 had excessively high powder resistance, and it may be found that the conductivity of the positive electrode may be secured if the BET specific surface area is satisfied in a suitable degree.

Also, in Comparative Example 5, where the weight average molecular weight of the polyvinylidene fluoride was 1,200,000 g/mol which was higher than 980,000 g/mol, both the powder resistance and the viscosity of the positive electrode slurry were very high degrees. In Comparative Example 6, where the weight average molecular weight of the polyvinylidene fluoride was 500,000 g/mol which was lower than 720,000 g/mol, the powder resistance was excellent but the viscosity of the positive electrode slurry was excessively low, and thus, the costing and drying processability during manufacturing the positive electrode was significantly degraded, and the manufacturing cost was increased. In addition, the positive electrode adhesiveness was excessively low and the deintercalation of the positive electrode active material is expected.

The invention claimed is:

1. A positive electrode comprising a current collector and a positive electrode active material layer disposed on the current collector,
wherein the positive electrode active material layer comprises a positive electrode active material, a carbon nanotube, and a binder,
the binder comprises polyvinylidene fluoride which has a weight average molecular weight of 720,000 g/mol to 980,000 g/mol,
a BET specific surface area of the carbon nanotube is 140 m$^2$/g to 195 m$^2$/g, and
the positive electrode satisfies the following Formula 1:

$$1.3 \leq B/A \leq 3.4 \quad \text{[Formula 1]}$$

wherein, in the Formula 1, B is an amount (wt %) of the polyvinylidene fluoride in the positive electrode active material layer, and A is an amount (wt %) of the carbon nanotube in the positive electrode active material layer.

2. The positive electrode according to claim 1, wherein the carbon nanotube is a bundle type carbon nanotube comprising a plurality of carbon nanotube units.

3. The positive electrode according to claim 2, wherein an average diameter of a carbon nanotube unit of the plurality of carbon nanotube units is from 1 nm to 30 nm.

4. The positive electrode according to claim 1, wherein the positive electrode satisfies the following Formula 2:

$$1.3 \leq B/A \leq 1.85 \quad \text{[Formula 2]}$$

wherein, in the Formula 2, B is an amount (wt %) of the polyvinylidene fluoride in the positive electrode active material layer, and A is an amount (wt %) of the carbon nanotube in the positive electrode active material layer.

5. The positive electrode according to claim 1, wherein the positive electrode active material comprises Li[Ni$_{x1}$Mn$_{y1}$Co$_{z1}$]O$_2$, wherein $0.40 \leq x1 \leq 0.70$, $0.15 \leq y1 \leq 0.30$, $0.15 \leq z1 \leq 0.30$, and $x1+y1+z1=1$.

6. The positive electrode according to claim 1, wherein the positive electrode active material is comprised in 95.6 wt % to 99.0 wt % in the positive electrode active material layer.

7. The positive electrode according to claim 1, wherein an average particle diameter (D50) of the positive electrode active material is from 3 μm to 20 μm.

8. The positive electrode according to claim 1, wherein the binder comprises a non fluorine-based binder.

9. The positive electrode according to claim 8, wherein the non fluorine-based binder is at least one of nitrile butadiene rubber or hydrogenated-nitrile butadiene rubber.

10. A secondary battery comprising:
the positive electrode according to claim 1;
a negative electrode;
a separator disposed between the positive electrode and the negative electrode; and
an electrolyte.

11. The positive electrode according to claim 1, wherein the positive electrode active material layer has a powder resistance of 42.0 Ω·cm to 94.2 Ω·cm.

12. The positive electrode according to claim 1, wherein the positive electrode has an adhesiveness of 21.1 gf/20 mm to 33.0 gf/20 mm.

* * * * *